US010458248B2

(12) United States Patent
Wolfrum et al.

(10) Patent No.: US 10,458,248 B2
(45) Date of Patent: Oct. 29, 2019

(54) BLADE CHANNEL, BLADE CASCADE AND TURBOMACHINE

(71) Applicant: MTU Aero Engines AG, Munich (DE)

(72) Inventors: Nina Wolfrum, Feldkirchen (DE); Markus Brettschneider, Karlsfeld (DE); Inga Mahle, Munich (DE); Markus Schlemmer, Mainburg/Sandelzhausen (DE); Martin Pernleitner, Dachau (DE)

(73) Assignee: MTU Aero Engines AG, Munich (DE)

( * ) Notice: Subject to any disclaimer, the term of this patent is extended or adjusted under 35 U.S.C. 154(b) by 260 days.

(21) Appl. No.: 15/365,339

(22) Filed: Nov. 30, 2016

(65) Prior Publication Data
US 2017/0159444 A1 Jun. 8, 2017

(30) Foreign Application Priority Data

Dec. 4, 2015 (DE) .................. 10 2015 224 376

(51) Int. Cl.
F01D 5/14 (2006.01)
B63H 21/00 (2006.01)
B64D 27/02 (2006.01)
F01D 5/02 (2006.01)
B63H 1/26 (2006.01)

(52) U.S. Cl.
CPC .............. F01D 5/145 (2013.01); B63H 21/00 (2013.01); B64D 27/02 (2013.01); F01D 5/02 (2013.01); F01D 5/143 (2013.01); B63H 1/26 (2013.01); F05D 2220/30 (2013.01)

(58) Field of Classification Search
CPC .............. F01D 5/145; F01D 5/143; F01D 5/02
See application file for complete search history.

(56) References Cited

U.S. PATENT DOCUMENTS 8,177,499 B2    5/2012  Iida
8,647,066 B2 *  2/2014  Guimbard ............... F01D 5/143
                                                  416/193 A (Continued)

FOREIGN PATENT DOCUMENTS

EP    2487329    2/2011
EP    1995410    10/2012

(Continued)

Primary Examiner — Nathaniel E Wiehe
Assistant Examiner — Andrew J Marien
(74) Attorney, Agent, or Firm — Davidson, Davidson & Kappel, LLC

(57) ABSTRACT

A blade channel of a turbomachine that is delimited in the circumferential direction of the turbomachine by a pressure side of an airfoil and by an opposite suction side of an adjacent airfoil that, in the radial direction of the turbomachine, is delimited by two opposing side walls, and whose extent in the axial direction of the turbomachine is delimited by leading edges and by trailing edges of airfoils; at least one of the side walls being provided with localized contours, of which at least two are formed as elevations and at least two as depressions; a saddle surface being formed between the contours that, in one rotation, alternately merges into an elevation and a depression; a blade cascade having such blade channels, as well as a turbomachine having such a blade cascade.

11 Claims, 1 Drawing Sheet

(56) References Cited

U.S. PATENT DOCUMENTS

| | | | |
|---|---|---|---|
| 8,807,930 B2* | 8/2014 | Green | F01D 5/141 415/191 |
| 8,985,957 B2* | 3/2015 | Mahle | F01D 5/143 416/193 A |
| 9,453,415 B2* | 9/2016 | Engel | F01D 5/12 |
| 9,470,094 B2* | 10/2016 | Mahle | F01D 5/143 |
| 10,041,353 B2* | 8/2018 | Gier | F01D 5/142 |
| 2011/0014056 A1* | 1/2011 | Guimbard | F01D 5/143 416/223 A |
| 2011/0044818 A1* | 2/2011 | Kuhne | F01D 5/143 416/212 A |
| 2011/0189023 A1 | 8/2011 | Guimbard et al. | |
| 2012/0201688 A1* | 8/2012 | Mahle | F01D 5/143 416/235 |
| 2013/0017095 A1 | 1/2013 | Lee et al. | |
| 2014/0348660 A1* | 11/2014 | Guendogdu | F01D 5/145 416/242 |
| 2014/0348661 A1* | 11/2014 | Mahle | F01D 5/141 416/243 |
| 2015/0044038 A1 | 2/2015 | Gier et al. | |
| 2017/0089203 A1* | 3/2017 | Lohaus | F01D 5/14 |
| 2017/0159443 A1* | 6/2017 | Pernleitner | F01D 5/02 |
| 2017/0218769 A1* | 8/2017 | Venugopal | F01D 5/145 |
| 2017/0370234 A1* | 12/2017 | Brettschneider | F01D 5/30 |

FOREIGN PATENT DOCUMENTS

| | | |
|---|---|---|
| EP | 2692986 A1 | 2/2014 |
| EP | 2787172 | 10/2014 |
| EP | 2806102 | 11/2014 |
| EP | 2835499 A1 | 2/2015 |
| EP | 2696029 | 10/2015 |
| FR | 2928174 A1 | 9/2009 |

* cited by examiner

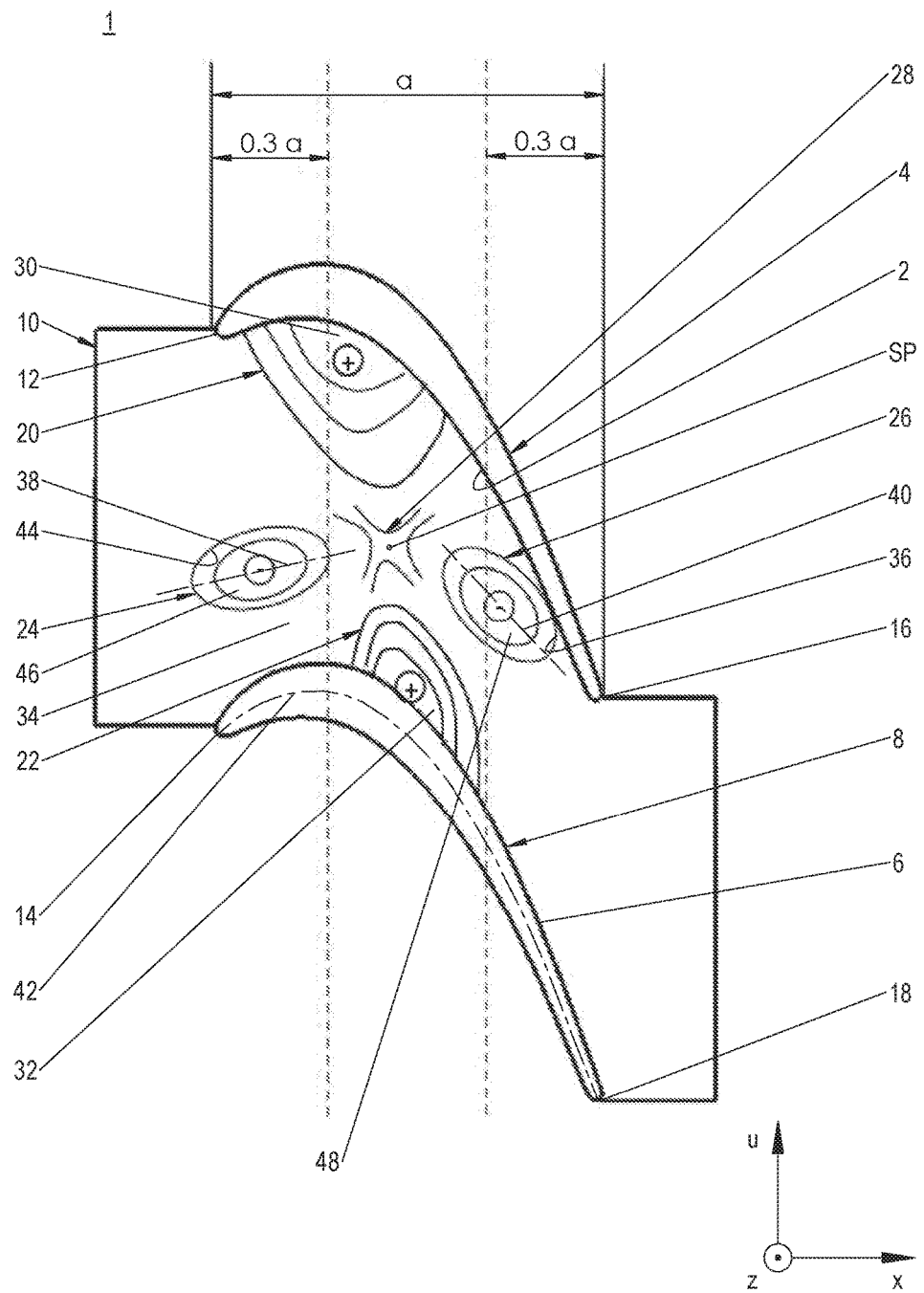

BLADE CHANNEL, BLADE CASCADE AND TURBOMACHINE

The present invention relates to a blade channel of a turbomachine, a blade cascade for a turbomachine, and to a turbomachine.

BACKGROUND

A fluid flow conveyed through a flow channel is regularly deflected by a lateral pressure gradient parallel to the side walls. Due to the lower velocity thereof, the flow layers proximal to the wall are deflected to a greater degree than the flow layers distal to the wall, thereby forming a secondary flow that is superimposed on a primary flow. This leads to vortices and, inter alia, to pressure losses. The secondary flows regularly occur in blade cascades of turbomachines, such as gas and steam turbines. The blade cascades are composed of a multiplicity of blades or airfoils, which are adjacently disposed in the circumferential direction of the turbomachine and disposed in a rotationally-symmetric flow channel, what is commonly known as an annulus, and between each of which, a blade channel is formed in which the secondary flows are formed. In the circumferential direction of the turbomachine, the blade channels are each delimited by a pressure side and a suction side of the mutually adjacent blades. In the radial direction of the turbomachine, the blade channels are each delimited by a radially outer, respectively housing-side side wall and by a radially inner, respectively hub-side side wall. The side walls are formed by a stationary housing section, by a rotor section, by radially inner shroud plates and/or by radially outer shroud plates. To reduce the secondary flows, contours in the form of elevations and/or depressions are frequently introduced into the side walls.

From the related art, a multiplicity of what are generally referred to as side-wall contours are known. Mentioned exemplarily are the patents or patent applications of the Applicant EP 2 487 329 B1, EP 2 787 172 A2, and EP 2 696 029 B1.

SUMMARY OF THE INVENTION

It is an object of the present invention to provide a blade channel of a turbomachine having reduced secondary flows, a blade cascade for a turbomachine having reduced secondary flows, and a turbomachine having an enhanced efficiency.

The present invention provides a blade cascade of a turbomachine, by a blade cascade, and by a turbomachine.

An inventive blade channel of a turbomachine is delimited in the circumferential direction of the turbomachine by a pressure side of an airfoil and by an opposite suction side of an adjacent airfoil. In the radial direction of the turbomachine, the blade channel is delimited by two opposing side walls. In the axial direction of the turbomachine, the blade channel extends between leading and trailing edges of the airfoils. At least one side wall is provided with localized contours, of which at least two are formed as elevations and at least two as depressions. The present invention provides that a saddle surface be formed between the contours. It alternately merges into an elevation and a depression over one revolution about the saddle surface.

"Elevation" signifies a localized extent of the one side wall in the direction of the opposite side wall. "Depression" signifies a localized extent of the one side wall away from the opposite side wall.

The side-wall contouring according to the present invention influences a static pressure field at the at least one side wall and at the mutually adjacent airfoils in a way that reduces a secondary flow in the blade channel. Flow losses are hereby reduced and an inflow to a subsequent blade row is enhanced. The saddle surface has a saddle point that resides radially outwardly, radially inwardly or at the level of a non-contoured surface section of the side wall. In a continuously differentiable function, a point is a saddle point when the gradient thereof is equal to zero and there is no local extremum. The contours and thus the saddle surface may be formed at the radially inner side wall, at the radially outer side wall or at both side walls.

It turns out to be advantageous when the saddle surface is located within a range of 30% to 70% of an axial channel extent.

In an especially preferred exemplary embodiment, the saddle surface is located within a range of 40% to 60% of the axial channel extent. This makes it possible to further reduce the secondary flow.

In the circumferential direction, the saddle surface is preferably situated approximately in the middle between the airfoils, which leads to a further reduction in the secondary flow.

The elevations may be configured relative to each other in the circumferential direction. The depressions are then configured relative to each other in the axial direction. It is self-evident that the elevations may also be configured relative to each other in the axial direction, and the depressions relative to each other in the circumferential direction. In a plan view, i.e., in a direction of view from radially outwardly to inwardly, this measure results in a cross-shaped configuration of the contours relative to one another.

The elevations and depressions may have different heights, respectively depths. The secondary flow may be hereby further influenced.

In one exemplary embodiment, the one elevation engages by the maximum, respectively the highest section thereof on the pressure side, and the other elevation by the maximum thereof on the suction side.

The pressure-side elevation may begin upstream of the suction-side elevation, and the suction-side elevation downstream of the pressure-side elevation. The terms "upstream" and "downstream" simply relate to the flow direction of a primary flow traversing the turbomachine along the axial channel extent. Flowing through each blade channel in a multitude of blade channels is a primary flow component that, after passing the blade channels, is again merged with the primary flow into the other primary flow components. The terms "upstream" and "downstream" do not take into consideration an actual deflection of the primary flow component in the circumferential direction in the blade channel.

In the plan view, the depressions have an oval shape and are axially positioned relative to each other, whereby they extend by the respective longitudinal axes thereof quasi parallel to an opposite segment of a mean camber line of the suction side-forming airfoil. They are hereby approximately oriented to a circumferentially deflected primary flow component in the blade channel. Thus, they are traversed by flow in the longitudinal direction.

The depression that is leading in the direction of flow is preferably proximal to the suction side, and the trailing depression is preferably disposed on the pressure side.

The leading depression may begin upstream of the pressure-side elevation, and the trailing depression may end downstream of the suction-side elevation. In particular, the leading depression may begin upstream of the leading edges, and thus outside of the blade channel. The primary flow component streaming through the blade channel hereby begins to be influenced already before it enters into the blade channel.

A preferred blade cascade of a turbomachine has a multiplicity of blade channels according to the present invention. In each instance, this measure influences a static pressure field in the blade channels of the blade cascade in a way that reduces a secondary flow in the blade cascade. Flow losses are reduced, and an inflow to a subsequent blade row is enhanced.

A preferred turbomachine has at least one blade cascade according to the present invention. A reduction in secondary flows enhances the efficiency of a turbomachine of this kind over that having a conventional blade cascade.

BRIEF DESCRIPTION OF THE DRAWINGS

A preferred exemplary embodiment of the present invention is described in greater detail below with reference to a schematic representation. In a plan view, the only FIG. 1 shows a section through an inventive blade channel of a turbomachine.

DETAILED DESCRIPTION

Blade channel 1 constitutes a portion of a blade cascade of an axial turbomachine, for example. The turbomachine is preferably an aircraft engine, without being limited thereto. For example, the turbomachine may also be a stationary gas turbine or a ship's propulsion. The blade cascade forms a section of an annulus of the turbomachine that is traversed by a primary flow. It is composed of a multiplicity of blade channels 1 that are disposed in circumferential direction u of the turbomachine that are each traversed by a primary flow component. The primary flow components are deflected in blade channels 1 in circumferential direction u, and, altogether, yield the primary flow. The blade cascade is preferably a rotor blade cascade that is optionally located in the area of a low-pressure turbine. Thus, in the exemplary embodiment shown here, the primary flow is a hot gas mixture, which, in simplified terms, flows through the turbomachine in the blade cascade region in axial direction x from left to right. However, the present invention may also be used for turbomachines having a radial or diagonal design. Terms, such as "axial direction or axial," "circumferential direction" and "radial direction or radial" refer to the axis of rotation of the turbomachine's machine rotor and, thus, to the centrally located machine axis. Since the blade cascade constitutes a part of the machine rotor, the terms are directly transferable to the blade cascade and, thus, to blade channel 1. Terms, such as "upstream," "downstream," "leading" or "trailing" simply refer to the direction, here axial, of the primary flow through the turbomachine in the blade cascade region.

In circumferential direction u of the turbomachine, blade channel 1 is delimited by a pressure side 2 of an airfoil 4 and by an opposite suction side 6 of an adjacent airfoil 8. In radial direction z of the turbomachine, blade channel 1 is delimited by two opposite side walls 10. Merely radially inner side wall 10 is visible because of the cross-sectional and plan view in FIG. 1. In axial direction x of the turbomachine, blade channel 1 is delimited by leading edges 12, 14 and by trailing edges 16, 18 of airfoils 4, 8. Blade channel 1 here has the axial extent, respectively channel extent a between leading edges 12, 14 and trailing edges 16, 18. Axial channel extent a is equal to an axial chord length of airfoils 4, 8 and corresponds simply to the direction of the primary flow through the turbomachine.

At least side wall 10, here radially inner, is provided with localized contours 20, 22, 24, 26. "Localized" signifies that the contours predominantly occupy only a limited surface area of side wall 10, and side wall 10 may likewise have non-contoured surface sections. "Non-contoured surface sections" are surface sections that follow an original profile of side wall 10. The original profile is a circular segment relative to the axis of rotation of the machine rotor. In the exemplary embodiment shown here, four contours 20, 22, 24, 26 are provided. Two contours 20, 22 are thereby formed as elevations and two as depressions 24, 26. "Elevation" signifies side wall 10 extending radially, in a localized manner relative to a non-contoured surface section thereof into the annulus. "Depression" signifies side wall 10 extending in a localized manner relative to a non-contoured surface section thereof radially away from the annulus.

In accordance with the present invention, a saddle surface 28 is formed between contours 20, 22, 24, 26 that, in one revolution, alternately merges into an elevation 20, 22 and a depression 24, 26. In the exemplary embodiment shown here, saddle surface 28 is located within a range of from 0.3 a to 0.7 a, respectively 30% to 70% of axial extent a of the channel, preferably within a range of from 40% to 60% of axial extent a of the channel. Axial extent a of the channel is understood to refer to the axial distance between the leading edge of the blades and the trailing edges thereof. Considered in circumferential direction u, saddle surface 28 is situated approximately in the middle between airfoils 4, 8. Saddle surface 28 has a saddle point SP that resides radially outwardly, radially inwardly or at the level of non-contoured surface sections of side wall 10. In a continuously differentiable function, a point is a saddle point when the gradient thereof is equal to zero and there is no local extremum.

The two elevations 20, 22 are essentially disposed in circumferential direction u relative to each other, and the two depressions 24, 26 are essentially disposed in axial direction x relative to each other. In the illustrated plan view, a cross-shaped configuration of contours 20, 22, 24, 26 is hereby derived, where, in one revolution, a depression 24, 26 alternately follows an elevation 20, 22, and vice versa. Saddle surface 28 is located in the intersecting region of contours 20, 22, 24, 26. As a general principle, elevations 20, 22 may have different or the same heights, and depressions 24, 26 different or the same depths.

The one elevation 20 is disposed on the pressure side, and the other elevation 22 on the suction side. Pressure-side elevation 20 begins downstream of leading edges 12, 14 and upstream of suction-side elevation 22. Over the entire height thereof, pressure-side elevation 20 merges into pressure side 2 and, thus, by maximum 30, respectively highest section thereof, is directly contiguous to pressure side 2.

Suction-side elevation 22 ends downstream of pressure-side elevation 20. It is located here within a range of 30% to 70% of axial extent a of the channel. Over the entire radial height thereof, it merges into suction side 6 and, thus, by maximum 32 thereof, is directly contiguous to suction side 6.

Depression 24, leading here, is located distally from pressure side 2 and proximally to suction side 6. However, it is spaced apart therefrom by an at least substantially non-contoured surface section 34. Considered in circumferential direction u, depression 26, trailing here, is located distally from suction side 6 and proximally to pressure side 2. By mouth region 36 thereof, trailing depression 26 is directly contiguous to pressure side 2. Leading depression 24 begins upstream of leading edges 12, 14 and, thus, outside of blade channel 1. It ends with saddle surface 28. Trailing depression 26 begins with saddle surface 28 and ends upstream of trailing edges 16, 18 and, thus, within blade channel 1.

In the illustrated plan view, depressions 24, 26 are oval; being positioned relative to each other in axial direction x by longitudinal axes 38, 40 thereof. By longitudinal axes 38, 40 thereof, depressions 24, 26 extend quasi parallel to an opposite segment of a mean camber line 42 of suction side-forming airfoil 8. This orients depressions 24, 26 to the primary flow component that is deflected in blade channel 1, so that they are longitudinally traversed by the flow thereof. Mouth regions 36, 44 thereof have approximately a same surface size. In the same way, minima 46, 48, respectively the deepest sections thereof have approximately a same surface size.

Provided are a blade channel of a turbomachine that, in the circumferential direction of the turbomachine, is delimited by a pressure side of an airfoil and by an opposite suction side of an adjacent airfoil that, in the radial direction of the turbomachine, is delimited by two opposing side walls and that, in the axial direction of the turbomachine, extends between leading and trailing edges of the airfoils; at least one of the side walls being provided with localized contours, of which at least two are formed as elevations and at least two as depressions; between the contours, a saddle surface being formed that, in one revolution, alternately merges into an elevation and a depression; a blade cascade having these types of blade channels, as well as a turbomachine having a blade cascade of this kind.

REFERENCE NUMERAL LIST 1 blade channel
2 pressure side
4 airfoil
6 suction side
8 airfoil
10 side wall
12 leading edge
14 leading edge
16 trailing edge
18 trailing edge
20 contour/pressure-side elevation
22 contour/suction-side elevation
24 contour/suction-side depression
26 contour/pressure-side depression
28 saddle surface
30 maximum/highest section
32 maximum/highest section
34 non-contoured surface section
36 mouth region
38 longitudinal axis
40 longitudinal axis
42 mean camber line
44 mouth region
46 minimum/deepest section
48 minimum/deepest section
a axial channel extent
SP saddle point
u circumferential direction of the turbomachine
x axial direction of the turbomachine/primary flow direction
z radial direction of the turbomachine

What is claimed is:

1. A blade channel of a turbomachine comprising:
in a circumferential direction of the turbomachine, a pressure side of an airfoil and an opposite suction side of an adjacent airfoil,
two opposing side walls,
the blade channel having an extent in the axial direction of the turbomachine delimited by leading edges and by trailing edges of the airfoil and the adjacent airfoil,
at least one of the side walls being provided with localized contours, at least two of the localized contours being formed as elevations and at least two further of the localized contours as depressions;
a saddle surface being formed between the localized contours so that, in one revolution, the saddle surface alternately merges into one of the elevations and one of the depressions; wherein the elevations are configured relative to each other in the circumferential direction, and the depressions are configured relative to each other in the axial direction and wherein a leading depression of the depressions is configured close to the suction side, and a trailing depression of the depressions is configured on the pressure side, the saddle surface being in an intersecting region of the localized contours.

2. The blade channel as recited in claim 1 wherein the saddle surface being located within a range of 30% to 70% of an axial channel extent.

3. The blade channel as recited in claim 1 wherein the saddle surface is located within a range of 40% to 60% of an axial channel extent.

4. The blade channel as recited in claim 1 wherein the saddle surface is situated circumferentially in the middle between the airfoil and the adjacent airfoil.

5. The blade channel as recited in claim 1 wherein the elevations have different heights or the depressions have different depths.

6. The blade channel as recited in claim 1 wherein by a maximum thereof, a pressure-side elevation of the elevations is contiguous to the pressure side, and, by another maximum thereof, a suction-side elevation of the elevations is contiguous to the suction side.

7. The blade channel as recited in claim 6 wherein the pressure-side elevation begins upstream of the suction-side elevation, and the suction-side elevation ends downstream of the pressure-side elevation.

8. The blade channel as recited in claim 1 wherein the depressions are positioned relative to each other in axial direction, and extend by respective longitudinal axes parallel to a mean camber line of the adjacent airfoil.

9. The blade channel as recited in claim 1 wherein the leading depression begins upstream of a pressure-side elevation of the elevations, and the trailing depression ends downstream of a suction-side elevation of the elevations.

10. A blade cascade of a turbomachine comprising a plurality of blade channels as recited in claim 1.

11. A turbomachine comprising at least one blade cascade as recited in claim 10.

* * * * *